United States Patent
Blass et al.

(10) Patent No.: US 11,899,792 B2
(45) Date of Patent: Feb. 13, 2024

(54) SYSTEM FOR SECURITY SCANNING CODE WITH MINIMAL USER INTERFACE

(71) Applicant: Walmart Apollo, LLC, Bentonville, AR (US)

(72) Inventors: Oscar Blass, Bentonville, AR (US); Derrick Gene Wright, Springdale, AR (US); Austin Chase Lucas, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 106 days.

(21) Appl. No.: 16/839,541

(22) Filed: Apr. 3, 2020

(65) Prior Publication Data
US 2020/0320194 A1   Oct. 8, 2020

Related U.S. Application Data

(60) Provisional application No. 62/830,846, filed on Apr. 8, 2019.

(51) Int. Cl.
| | | |
|---|---|---|
| *G06F 21/56* | (2013.01) | |
| *G06F 21/55* | (2013.01) | |
| *G06F 21/57* | (2013.01) | |
| *G06F 21/72* | (2013.01) | |
| *G06F 11/36* | (2006.01) | |

(52) U.S. Cl.
CPC .......... *G06F 21/563* (2013.01); *G06F 21/552* (2013.01); *G06F 21/562* (2013.01); *G06F 21/577* (2013.01); *G06F 21/72* (2013.01); *G06F 11/3604* (2013.01); *G06F 2221/033* (2013.01)

(58) Field of Classification Search
CPC ...... G06F 21/552; G06F 21/563; G06F 21/72; G06F 2221/033; G06F 21/56; G06F 21/562; G06F 21/57; G06F 21/577; G06F 11/36–3616
See application file for complete search history.

(56) References Cited

U.S. PATENT DOCUMENTS

| | | |
|---|---|---|
| 7,533,116 B2 | 5/2009 | Lacy |
| 8,239,952 B1 | 8/2012 | Oliphant |
| 8,407,797 B1 | 3/2013 | Novitchi |
| 9,104,878 B1 | 8/2015 | Khairetdinov |
| (Continued) | | |

OTHER PUBLICATIONS

Wikipedia, "Comment (computer programming)" (Year: 2023).*
Unknown, "Source 1: Use Open Source. Stay Secure; Source 2: Snyk CLI", Snyk, 18 pages.

*Primary Examiner* — D'Arcy Winston Straub
(74) *Attorney, Agent, or Firm* — Foley IP Law, PLLC (57) ABSTRACT

Examples provide a single-command menu option for initiating security scanning of source code without user interaction with the security scan component performing the security scan. The single-command menu option can include a single-click menu option in a graphical user interface, a command-line utility or a web interface for performing web service calls to the security scanning service(s). A user selects source code for scanning. A zip file is created for the selected source code. The zip file is placed in a target directory or scan queue for upload to the security scan component. A user ID appended to the source code is utilized to return a summary report of the scan results to the user without user credentials or login to the system.

20 Claims, 7 Drawing Sheets

(56) References Cited

U.S. PATENT DOCUMENTS

| | | | |
|---|---|---|---|
| 9,756,070 B1* | 9/2017 | Crowell | G06F 21/56 |
| 9,781,146 B2 | 10/2017 | Sridhar | |
| 10,395,041 B1* | 8/2019 | Youngberg | G06F 11/3608 |
| 10,459,822 B1* | 10/2019 | Gondi | G06F 8/75 |
| 2008/0244686 A1 | 10/2008 | Li et al. | |
| 2010/0211932 A1* | 8/2010 | Jones | G06F 8/20 |
| | | | 717/124 |
| 2012/0317645 A1* | 12/2012 | Fortier | G06F 21/566 |
| | | | 726/24 |
| 2014/0208431 A1* | 7/2014 | Archer | G06F 21/577 |
| | | | 726/25 |
| 2016/0180096 A1* | 6/2016 | Sharma | G06F 21/577 |
| | | | 726/25 |
| 2018/0107477 A1 | 4/2018 | Hill | |
| 2018/0121659 A1* | 5/2018 | Sawhney | G06F 21/566 |
| 2018/0316656 A1* | 11/2018 | Giglio | G06Q 20/1235 |
| 2020/0073783 A1* | 3/2020 | Hortala | G06F 9/54 |
| 2020/0097662 A1* | 3/2020 | Hufsmith | H04L 9/0643 |
| 2020/0210572 A1* | 7/2020 | Devane | G06F 21/566 |
| 2021/0216634 A1* | 7/2021 | Kenyon | G06F 21/52 |

\* cited by examiner

SYSTEM FOR SECURITY SCANNING CODE WITH MINIMAL USER INTERFACE

BACKGROUND

Security scanning of software typically requires multiple steps be taken by users. The user begins by creating a file containing the source code to be scanned for vulnerabilities. The user then logs into a security scanning site or tool. The user creates a project to host the code. The user uploads the code or gives the code location to the tool. When security scanning is complete, the user manually downloads the scan results for review. Many different system can be involved in this requiring user expertise in multiple different tools and processes. Moreover, processing security scanning on client nodes consumes large quantities of memory and processing resources. This is an inefficient and cumbersome process for users.

SUMMARY

Some examples provide a system for code security scanning with minimal user interface. The system includes a processor communicatively coupled to a memory. A scan initiation component uploads source code to a target directory when a single-command menu option is activated by a user to initiate security scanning of the selected source code. The selected source code includes a user identifier (ID). A listener component checks the target directory for unscanned code. The listener component submits the selected source code to a security scan component associated with a remote computing device via a network. A results component transmits a summary scan results report to the user associated with the selected source code.

Other examples provide a computer-implemented method for code security scanning. A scan initiation component uploads selected source code to a target directory on condition a user initiates security scanning of the selected source code by selecting a single-command menu option. A user identifier (ID) is appended to the selected source code. A listener component transfers the selected source code from the target directory to a security scan component in response to detecting a presence of the selected source code in the target directory. A results component transmits a summary scan results report to the user associated with the selected source code via an email account associated with the user when security scanning of the selected source code is complete.

Still other examples provide computer storage media having computer-executable instructions for security scanning code with minimal user interface. The computer-executable instructions are executed by a computer to cause the computer to output a right mouse button menu option for initiating a security scan on the selected source code via a single activation of the right mouse button. A scan initiation component uploads source code to a target directory when a user initiates security scanning of the source code by clicking on the right mouse button menu option. A listener component uploads the selected source code from the target directory to a security scan component in response to detecting a presence of the selected source code in the target directory. A results component transmits a summary scan results report to the user associated with the selected source code via an email account associated with the user on condition security scanning of the selected source code is complete.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseam.

Referring to the figures, examples of the disclosure enable security scanning via a code scanning manager with minimal user interface with security scanning systems. In some examples, the system enables single-click activation of security scanning user-selected code by a security scanning system and automatic return of scan results to the user's email address or storage of encrypted security scan results in a database for convenient viewing by the user.

The code scanning manager enables quick and easy activation of code scanning while eliminating user-interaction with the security scanning system itself. This improves user efficiency via the user interface interaction while increasing user interaction performance. The code scanning manager further simplifies (reduces complexity) of obtaining scan results for selected code.

The code scanning manager further reduces client software memory associated with scanning tools. This minimizes memory usage while reducing processor usage on client devices to improve resource usage during code security scanning processes. It further improves accessibility to diverse code scanning tools by reducing or eliminating the need to install or update security scanning tools on client devices.

Figure 1:
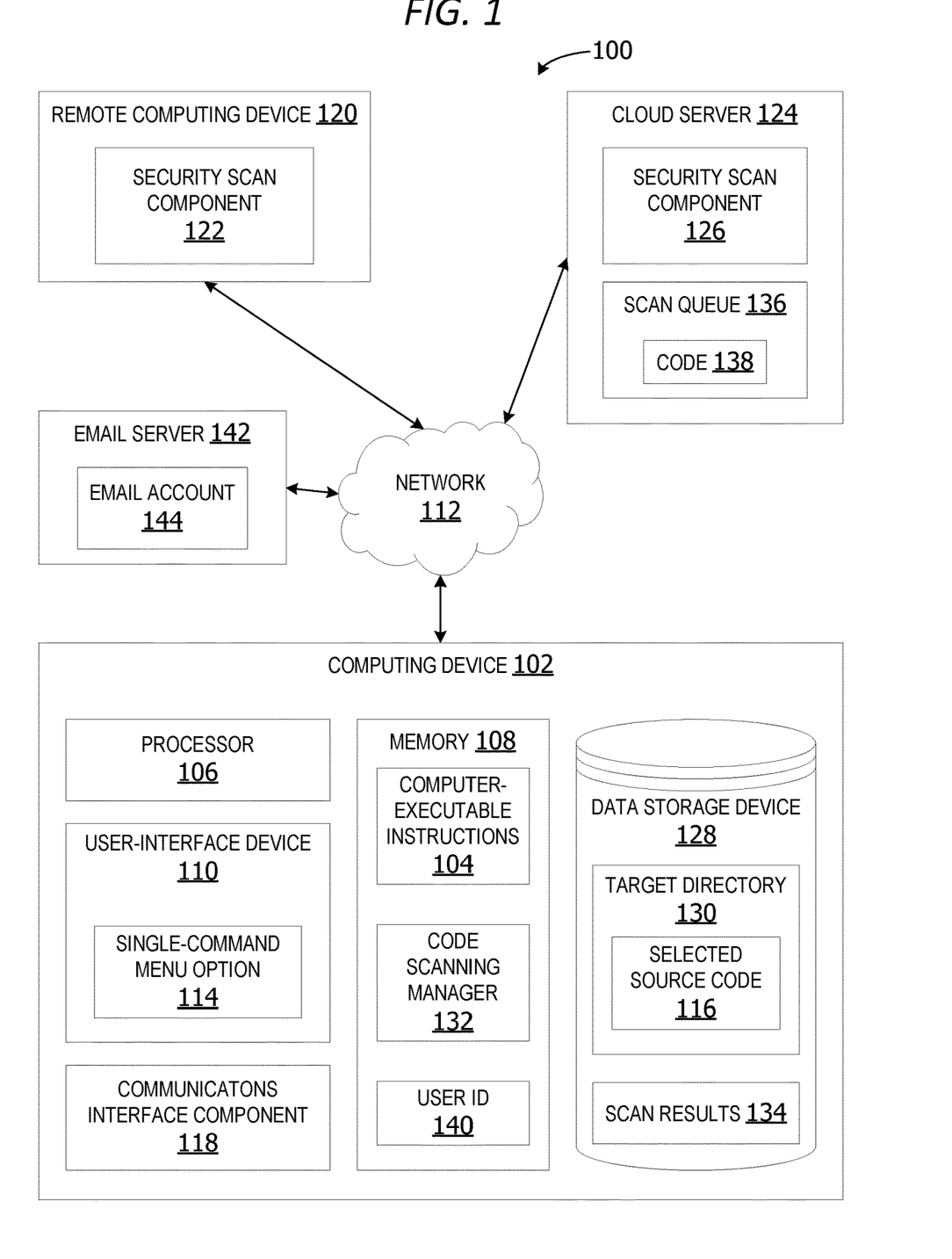
FIG. 1 is an exemplary block diagram illustrating a system for security scanning code with minimal user interface.

Referring again to FIG. 1, an exemplary block diagram illustrates a system 100 for security scanning code with minimal user interface. In the example of FIG. 1, the computing device 102 represents any device executing computer-executable instructions 104 (e.g., as application programs, operating system functionality, or both) to implement the operations and functionality associated with the computing device 102.

The computing device 102, in some examples, includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 in other examples includes a user interface device 110.

The processor 106 includes any quantity of processing units, and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 5 and FIG. 6).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The user interface device 110 in some examples provides a single-command menu option 114 for initiating security scanning of a selected portion of code, such as, but not limited to, the selected source code 116. The single-command menu option 114 can be implemented as a graphical icon in a graphical user interface (GUI), a command-line utility in a command-line interface, a web interface for calling a web service and/or a drag-and-drop function in the user interface.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 118. The communications interface component 118 includes a network interface card and/or computer-executable instructions (e.g., a driver) for operating the network interface card. Communication between the computing device 102 and other devices, such as but not limited to a remote computing device 120 hosting a security scan component 122 and/or a cloud server 124 hosting a security scan component 126, can occur using any protocol or mechanism over any wired or wireless connection. In some examples, the communications interface component 118 is operable with short range communication technologies such as by using near-field communication (NFC) tags.

The security scan component 122 and/or the security scan component 126 represents security scanning software, website, tool or other code scanning web services for analyzing computer-executable code to detect any potential flaws, errors or vulnerabilities in the code. The security scan component 122 can represent a single scan or multiple different types of scanning software. A security scan component can include a security scanning site or tool, such as, for example but without limitation, VERICODE®, RATION APPSCAN SOURCE®, or CHECKMARX® or any other code scanning software or tool.

The remote computing device 120 represents any device executing computer-executable instructions. The remote computing device 120 can be implemented as a mobile computing device, such as, but not limited to, a wearable computing device, a mobile telephone, laptop, tablet, computing pad, netbook, gaming device, and/or any other portable device. The remote computing device 120 includes at least one processor and a memory. The remote computing device 120 can also include a user interface device.

The cloud server 124 represents one or more logical servers providing services to the computing device 102 or other clients. The cloud server 124 is hosted and/or delivered via the network 112. In some non-limiting examples, the cloud server 124 is associated with one or more physical servers in one or more data centers. In other examples, the cloud server 124 is associated with a distributed network of servers providing web services, such as, but not limited to, scanning of source code to detect vulnerabilities or problems in the code.

The system 100 can optionally include a data storage device 128 for storing data, such as, but not limited to the selected source code 116. The selected source code 116 represents any code or portion of code selected by a user for scanning by the security scan component 122, the security scan component 126 and/or any other security scanning software. The selected source code 116 can represent an application, a portion of an application, a library function, code associated with a plug-in, or any other type of computer-executable instructions.

The data storage device 128 can include one or more different types of data storage devices, such as, for example, one or more rotating disks drives, one or more solid state drives (SSDs), and/or any other type of data storage device. The data storage device 128, in some non-limiting examples, includes a redundant array of independent disks (RAID) array. In other examples, the data storage device 128 includes a database and/or a directory, such as, but not limited to, the target directory 130.

The data storage device 128, in this example, is included within the computing device 102 or associated with the computing device 102. In other examples, the data storage device 128 includes a remote data storage accessed by the computing device via the network 112, such as a remote data storage device, a data storage in a remote data center, or a cloud storage.

The memory 108 in some examples stores one or more computer-executable components, such as, but not limited to, a code scanning manager 132. A user initiates the code scanning manager 132 by activating a single-command menu option 114 associated with the user interface device 110 to begin scanning of the selected source code 116 by one or more security scan components, such as, but not limited to, the security scan component 122 and/or the security scan component 126.

Upon activation, the code scanning manager 132 uploads the selected source code 116 to the selected security scan component for scanning to detect any flaws, potential problems, errors or vulnerabilities in the code. When the code scanning is complete, the security scan component sends the scan results 134 back to the code scanning manager 132 in some examples. The code scanning manager 132 transfers the scan results 134 to an email address associated with the user and/or stores the scan results 134 in a database on a data store, such as, but not limited to, the data storage device 128.

In some examples, the results of the one or more security scans and/or code checks performed on the code is only delivered to the user that initiated the security scan. The system submits the code for scanning/checks and creates a project that only the user can see/access or otherwise view. This improves security of the results.

In this example, the scan results are shown stored on the computing device 102. In other examples, the scan results 134 can be stored on a remote data storage, such as a cloud storage, a data store on a remote computing device, or a remote email server accessed by the computing device via the network 112. In these examples, the computing device 102 connects to the remote data store, remote computing device 120, cloud server 124 or email server to access the scan results 134.

In other examples, the code scanning manager 132 uploads the selected source code to a scan queue 136 associated with the selected security scan component 126. The code 138 in the scan queue 136 represents one or more portions of code, applications, or other software programs waiting to be scanned/analyzed by the security scan component 126.

In still other examples, the code scanning manager 132 appends a user identifier (ID) 140 to the selected source code 116 prior to submitting the selected source code to a security scan component, a scan queue 136 or a target directory in preparation for scanning. The user ID 140 is an identifier associated with the user submitting the selected source code 116 for scanning. The code scanning manager 132 and/or the security scan component utilizes the user ID 140 to determine a destination for the scan results 134.

In a non-limiting example, the system 100 can utilizes the user ID 140 to locate an email address associated with the user. The scan results 134 are then emailed to the email address for review by the user upon completion of the scanning process.

In some non-limiting examples, the system 100 optionally includes an email server 142 hosting an email account 144 associated with the user initiating the security scan of the selected source code 116. The code scanning manager in these examples sends the scan results 134 to the email account 144 of the user upon completion of the security scan(s).

The scan results 134 identify vulnerabilities or problems in the code, such as, but not limited to, command injections in lines of source code. The scan results enable the user to view the coding error without user interaction with the security software (security scan component). Thus, the user is able to obtain security scans from a tool without interacting directly with the tool.

In this manner, the system 100 enables single-command security scanning of code with minimal user interface and minimal software components on a client device, such as the computing device 102. The system 100 provides cross-platform security scanning by users without project creation, without user creation, and without user access management. The code scanning manager reduces central processing unit (CPU) and memory usage by the computing device 102 (client) during security scanning of the selected source code 116. The user can login to the backend to view their scan results or retrieve scan results from their email account. This improves efficiency and ease of viewing scan results.

The single-command menu options further provide fast entry points to security scanning pipeline associated with one or more code scanning tools (security scan components). The single-command menu options eliminate the requirements for installing plugins associated with security scanning tools or login to the security scanning tools. This greatly simplifies the security scanning process.

Figure 2:
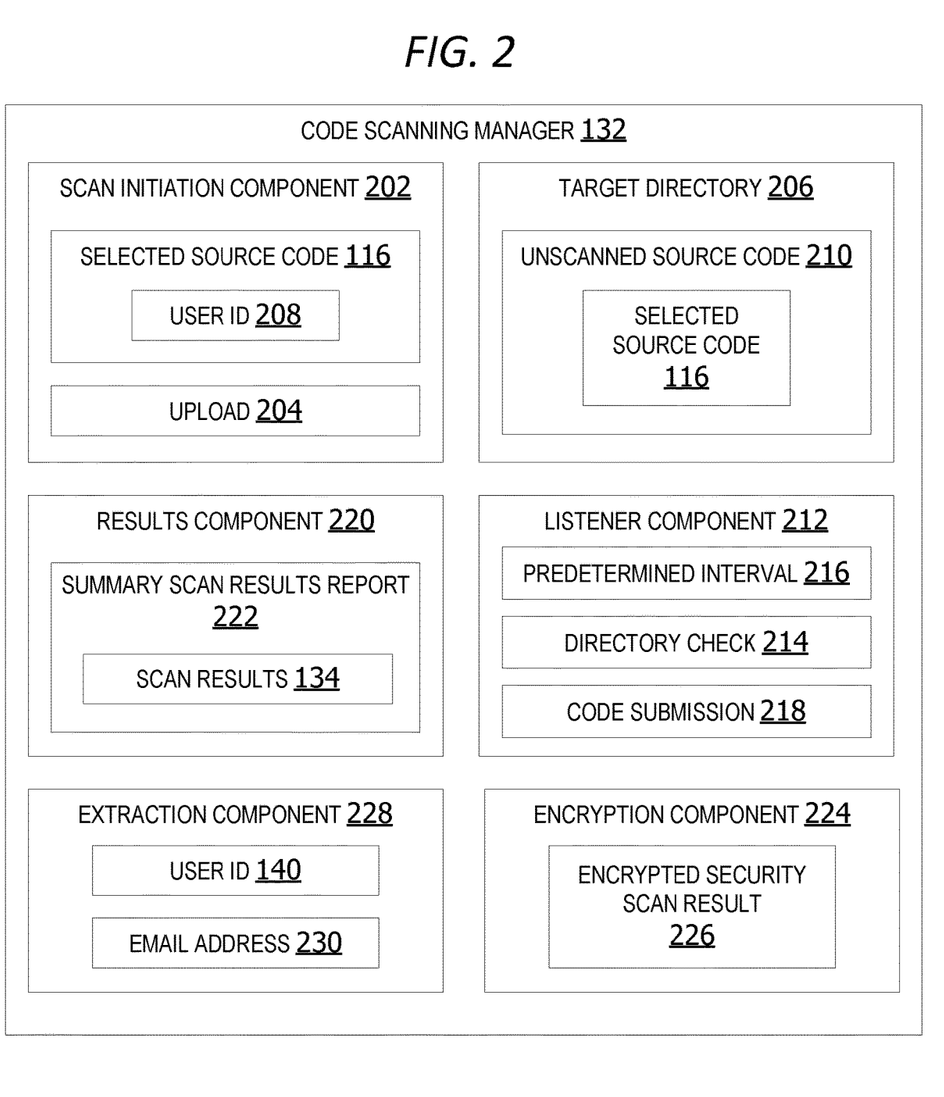
FIG. 2 is an exemplary block diagram illustrating a code scanning manager for managing a security scanning of user-selected code with minimal user interface associated with the security scanning system.

FIG. 2 is an exemplary block diagram illustrating a code scanning manager 132 for managing security scanning of user-selected code with minimal user interface associated with the security scanning system. A scan initiation component 202 performs an upload 204 of the selected source code 116 to a target directory 206. In these examples, the scan initiation component 202 uploads the source code when a user initiates security scanning of the selected source code via a single-command menu option, such as, but not limited to, the single-command menu option 114 in FIG. 1. In some examples, the scan initiation component 202 appends a user identifier (ID) 208 to the selected source code 116.

The target directory 206 is a data storage space holding unscanned source code 210 designated by a user for security scanning. The source code in the target directory has not yet been scanned by the appropriate security scan component.

A listener component 212 periodically checks the target directory 206 for unscanned source code 210. The listener component 212 in some examples, performs the directory check 214 of the target directory 206 for unscanned code at a predetermined interval 216.

The predetermined interval is any user-selected time-interval for checking the directory. The predetermined interval 216 is configurable and updateable to change the interval. The predetermined interval in one example is one minute. In this example, the listener component checks the target directory 206 every minute (sixty seconds). In another example, the predetermined interval 216 is ten seconds. In this example, the listener component checks the target directory 206 every ten seconds for new unscanned source code 210 selected by the user for scanning.

When the listener component 212 detects unscanned source code 210, such as the selected source code 116, the listener component 212 performs a code submission 218 action to submit/upload the selected source code 116 to a security scan component, such as, but not limited to, the security scan component 122 or the security scan component 126 in FIG. 1. The security scan component can be located on the same computing device as the code scanning manager 132, located on a remote computing device, or located on a cloud, such as, but not limited to, the cloud server 124.

In some examples, the listener component wakes up periodically (every minute) and looks for work in the target directory. The listener component feeds waiting unscanned code into the security scanning software forming a pipeline. The single-command menu options create multiple entry points into this code scanning pipeline. Any single-command menu option that can land a source code file in the target directory is scanned by right clicking and selecting a scan option, calling a command line or going to the webpage.

A results component 220 transmits a summary scan results report 222 to the user associated with the selected source code 116 upon completion of the scans of the selected source code 116. The summary scan results report 222 is a summary of the scan results 134 detailing vulnerabilities or other issues detected in the selected source code 116. The summary scan results report 222 includes a summary of the result of one or more security scans performed on code and/or the result of any other scan performed to check the code for flaws, faults or other potential issues.

In some examples, the code scanning manager 132 includes an encryption component 224. The encryption component 224 encrypts the scan results 134 and/or the summary scan results report 222, providing an encrypted security scan result 226, prior to transmission and/or delivery of the scan results 134 and/or the summary scan results report 222 to the user. In other examples, the security scan component encrypts the scan results 134 and/or the summary scan results report 222 prior to transmission of the results to the code scanning manager 132. In still other examples, the scan results 134 and/or the summary scan results report 222 is encrypted by the code scanning manager 132 prior to storing the scan results 134 and/or the summary scan results report 222 on a data storage device, such as, but not limited to, the data storage device 128 in FIG. 1 or a remote data store, such as, but not limited to, a cloud storage.

In other examples, an extraction component 228 extracts a user ID from the selected source code and identifies the user associated with the source code based on the user ID 140. The user ID 140 can be used by the system to email, via an email address 230, the scan results and/or the summary scan results report to the user that initiated the scanning of the selected source code 116. The user ID 140 can also be used to grant or deny access to the scan results 134 and/or the summary scan results report 222.

In a non-limiting example, if the system receives a request from a user to view the scan results 134 and/or the summary scan results report 222, the system utilizes the user ID 140 to determine whether to grant or deny the request. Only the user that uploaded the file is able to access the scan results.

Figure 3:
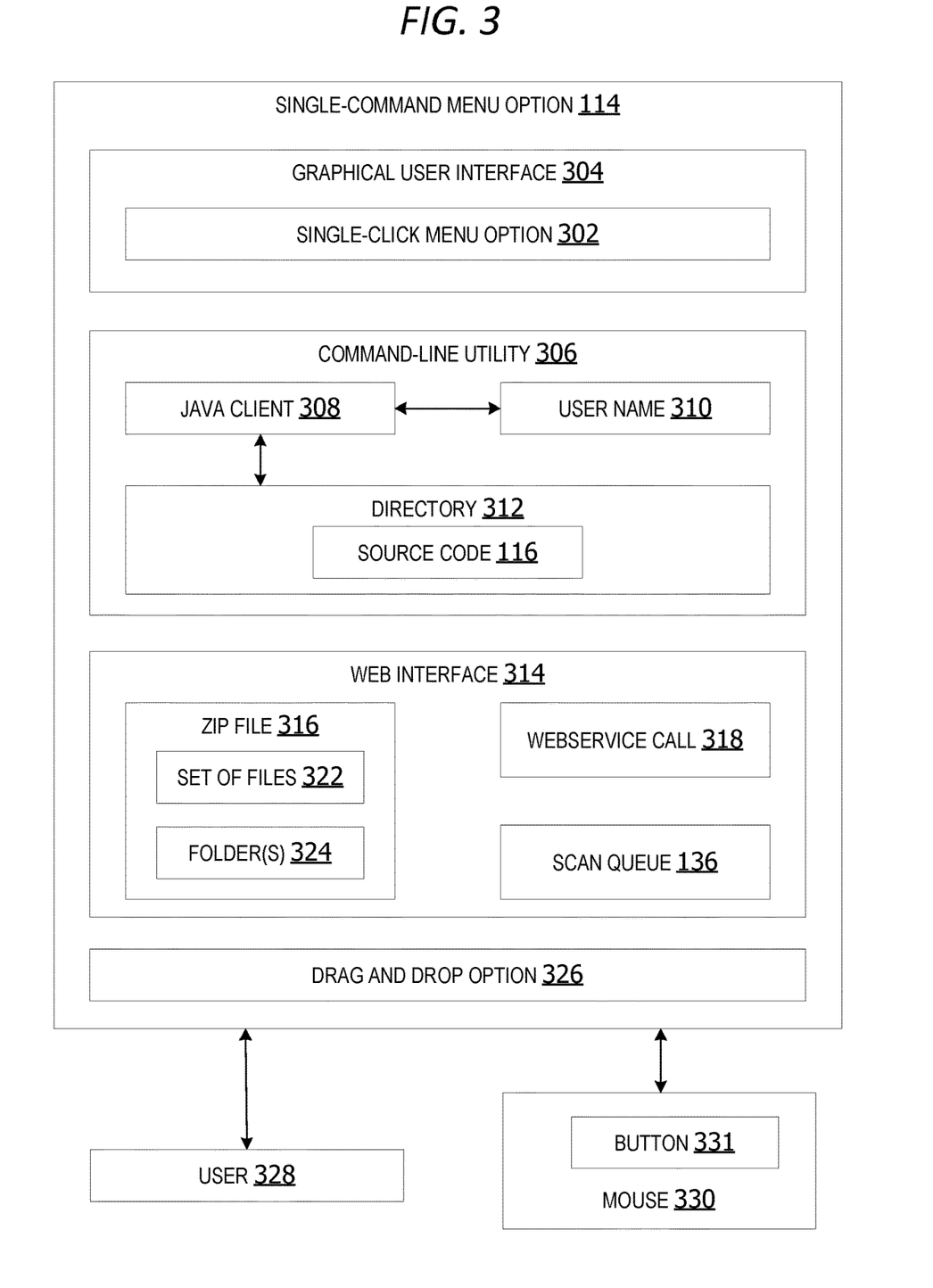
FIG. 3 is an exemplary block diagram illustrating single-command menu options for initiating security scanning of the user-selected code.

FIG. 3 is an exemplary block diagram illustrating single-command menu options for initiating security scanning of the user-selected code. The single-command menu option 114 in some examples includes a single click menu option 302 associated with a graphical user interface 304.

In other examples, the single-command menu option 114 further comprises a command-line utility 306 comprising a JAVA client 308 accepting a user name 310 and a directory 312 containing the selected source code 116. To initiate a security scan of software, the user calls one of these executables either in java jar or windows executable to scan the software. The system returns the scan results to the user via email. The user is not required to login to the security scan software (security scan component). Thus, authentication is eliminated to improve security because the user does not have to expose their credential to the system to perform the security scanning. Instead, the user provides the user name 310 (user id) indicating where scan results should be sent and directory (location) where the source code is stored.

The single-command menu option 114 in still other examples includes a web interface 314 configured to enable upload of a zip file 316 containing the selected source code 116 to a scan queue 136 associated with a security scan component, such as, but not limited to, the security scan component 122 and/or the security scan component 126 in FIG. 1. The web interface 314 connects to a remote computing device, such as a web server or a cloud services provider via a web service call 318. The web interface 314 copies the selected source code 116 to the scan queue 136 for scanning by the security scan component 126.

In some examples, the web interface 314 compresses a set of one or more files 322 and/or one or more folder(s) 324 containing the selected source code 116 into the zip file 316 prior to uploading the zip file 316 into the scan queue 136.

In still other examples, the system provides a drag and drop option 326. In this example, the user 328 utilizes a mouse, touch screen or other data input device to select an icon representing the selected source code 116. The user 328 drags the selected source code 116 icon and drops it into an icon representing the code scanning manager. The code scanning manager automatically initiates scanning of the selected source code 116 via the security scan component without further interaction by the user 328.

In this manner, the single-command menu option abstracts use of security software from the user and simplifies the interface to use security software. The system in these examples enables scanning of code with minimal client software components. A single registry entry is utilized for the single-click menu option. One JAVA® file to send the source code to the scan queue. This enables reduced memory usage and improved processor resource efficiency.

The single-command menu option 114 in some examples includes a right mouse 330 button 331 click on a the single-click menu option associated with a graphical icon representing the selected source code to initiate the security scanning of the selected source code. In this manner, the user 328 can activate the security scanning of selected code by pressing or otherwise using a button 331 on a mouse 330 or other input device to initiate the security scan via the single click option. In other examples, the user activates the code scanning via a touchscreen, pointer device, voice-activated control, keyboard, motion-activated sensor, or any other type of input device.

Figure 4:
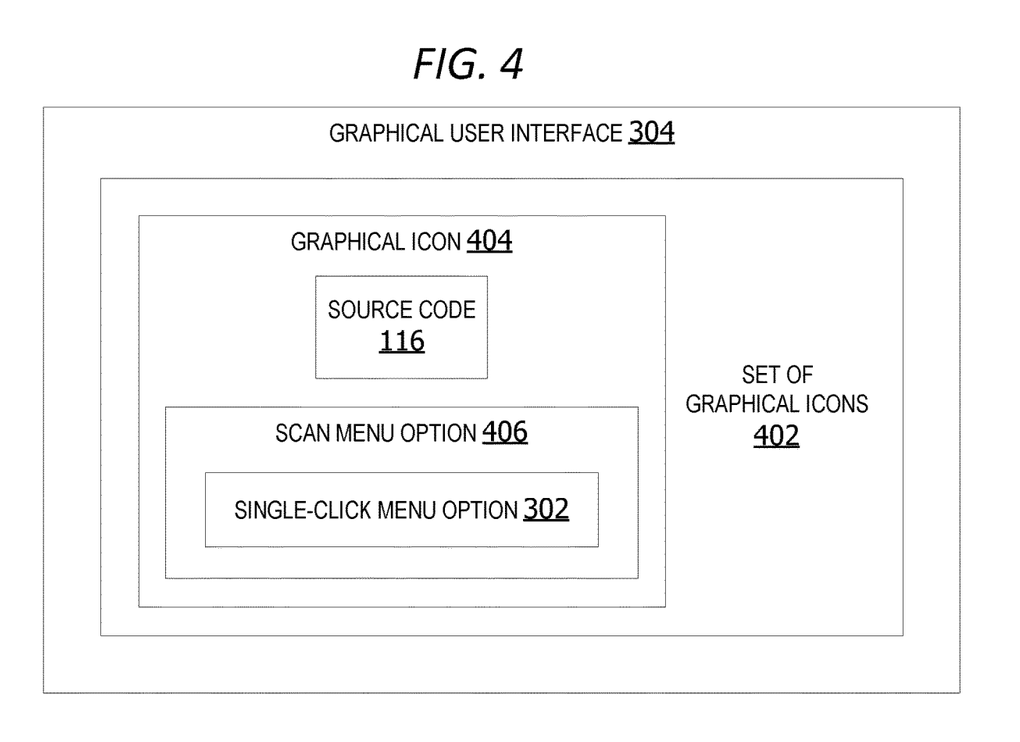
FIG. 4 is an exemplary block diagram illustrating a graphical user interface providing a single-click menu option for activating security scanning of user-selected code.

FIG. 4 is an exemplary block diagram illustrating a graphical user interface 304 providing a single-click menu option 02 3for activating security scanning of user-selected code. The graphical user interface 304 includes a set of graphical icons 402 representing one or more applications, files, folders and/or links to web pages or other web services. The user performs a right mouse button click on a scan menu option 406 associated with a graphical icon 404 representing the selected source code 116 to initiate the security scanning of the selected source code 116 via the security scan component.

In an illustrative example, a user can choose any zip file containing source code, such as, but not limited to, a "Scan test.zip" file. The user can click on the icon representing this file to access the scan menu option. Selecting the scan menu option enables upload of the source code. In a few minutes time, the user receives an email with security scan results for the scan performed on the "Scan test. zip" file. The user does not interact with the security scanning software (security scan component). The system does not require the user to have any experience or expertise with the security scan component (tool). The security software is abstracted. Moreover, the system does not require the user to perform any authentication (no login/password). This simplifies the security code scanning process for users.

Figure 5:
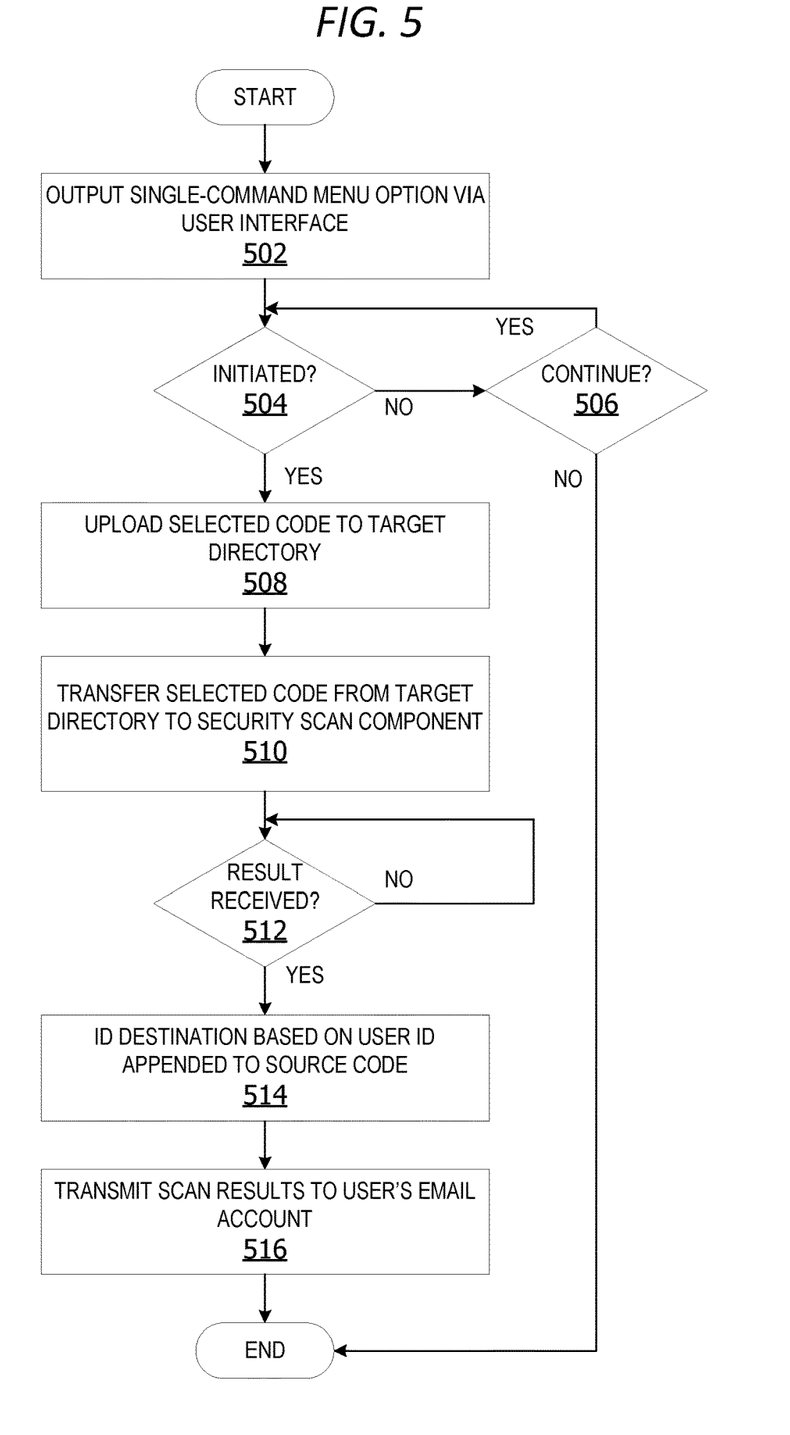
FIG. 5 is an exemplary flow chart illustrating operation of the computing device to manage security scanning of source code with minimal user interface.

FIG. 5 is an exemplary flow chart illustrating operation of the computing device to manage security scanning of source code with minimal user interface. The process shown in FIG. 5 is performed by a code scanning manager component, executing on a computing device, such as the computing device 102 in FIG. 1.

The process begins by outputting a single-command menu option via a user interface 502. The user interface is an interface for initiating scanning of code, such as, but not limited to, the user interface device 110 in FIG. 1 and/or the graphical user interface 304 in FIG. 3 and/or FIG. 4. The code scanning manager determines whether scanning of selected code has been initiated at 504. Scanning can be initiated via a single-command menu option. The code scanning manager is a component such as, but not limited to, the code scanning manager 132 in FIG. 1 and/or FIG. 2. If scanning is not initiated, the code scanning manager determines whether to continue at 506. If yes, the process returns to 504.

If code scanning is initiated at 504, the code scanning manager uploads selected code to a target director at 508. The target directory is a directory on a data storage, such as, but not limited to, the target director 206 in FIG. 2.

A listener component transfers the selected code from the target directory to a security scan component at 510. The listener component is a component, such as, but not limited to, the listener component 212 in FIG. 2. The code scanning manager determines if scan results are received back from the security scan component at 512. If yes, the code scanning manager identifies a destination for the scan results based on a user ID appended to the selected source code at 514. The code scanning manager transmits the scan results to the user's email account at 516. The process terminates thereafter.

While the operations illustrated in FIG. 5 are performed by a computing device, aspects of the disclosure contemplate performance of the operations by other entities. In a non-limiting example, a cloud service performs one or more of the operations.

Figure 6:
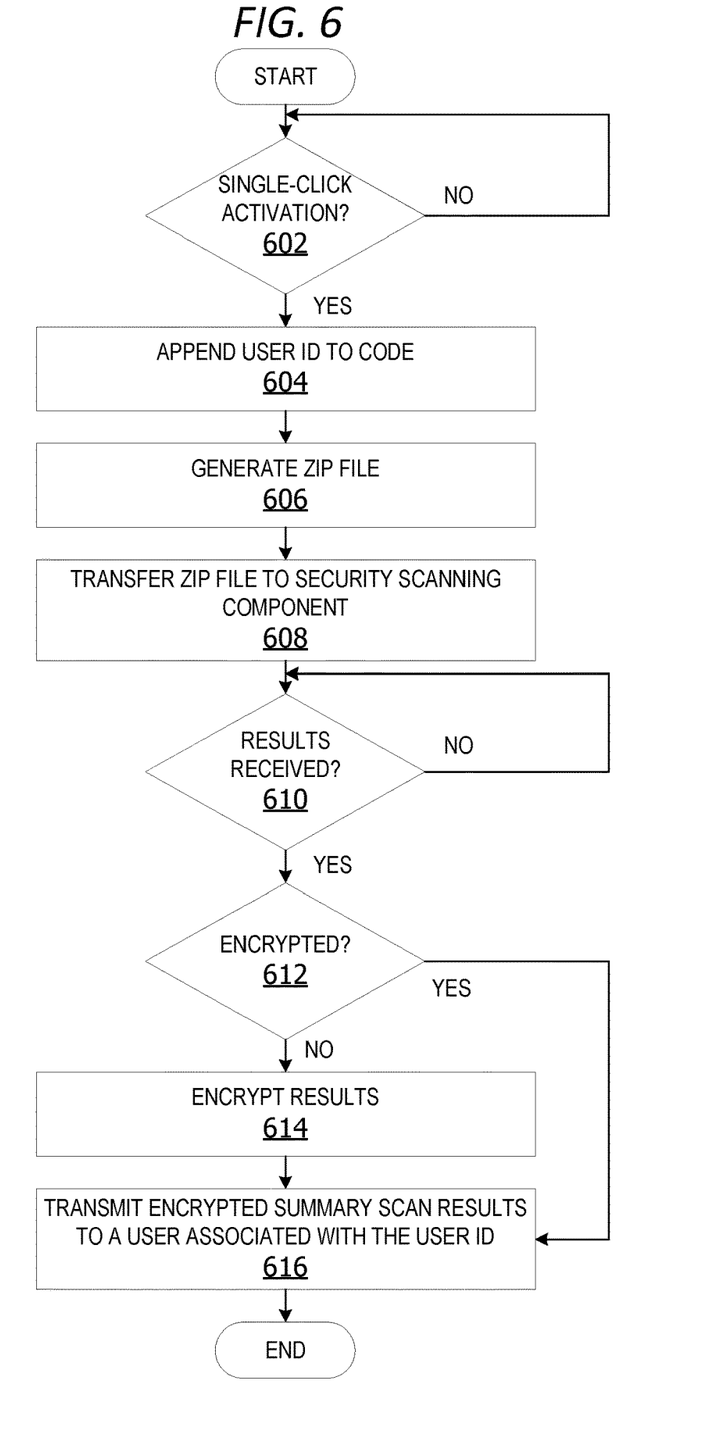
FIG. 6 is an exemplary flow chart illustrating operation of the computing device to upload source code to a security scan component and return scan results to the user with minimal user interface.

FIG. 6 is an exemplary flow chart illustrating operation of the computing device to upload source code to a security scan component and return scan results to the user with minimal user interface. The process shown in FIG. 6 is performed by a code scanning manager component, executing on a computing device, such as the computing device 102 in FIG. 1.

The process begins by determining if a single-click menu option to initiate security scanning of a selected source code is activated at 602. If yes, the code scanning manager appends a user ID to the selected source code at 604. The code scanning manager generates a zip file of the selected source code at 606. The code scanning manager transfers the zip file to the security scan component at 608. The code scanning manager determines if scan results are received from the security scan component at 610. If yes, the code scanning manager determines if the scan results are encrypted at 612. If no, the code scanning manager encrypts the scan results at 614. The code scanning manager transmits the encrypted summary scan results to a user associated with the user ID at 616. In some examples, the summary scan results are transmitted to the user via an email account, such as, but not limited to, the email account 144 in FIG. 1.

While the operations illustrated in FIG. 6 are performed by a computing device, aspects of the disclosure contemplate performance of the operations by other entities. In a non-limiting example, a cloud service performs one or more of the operations.

Figure 7:
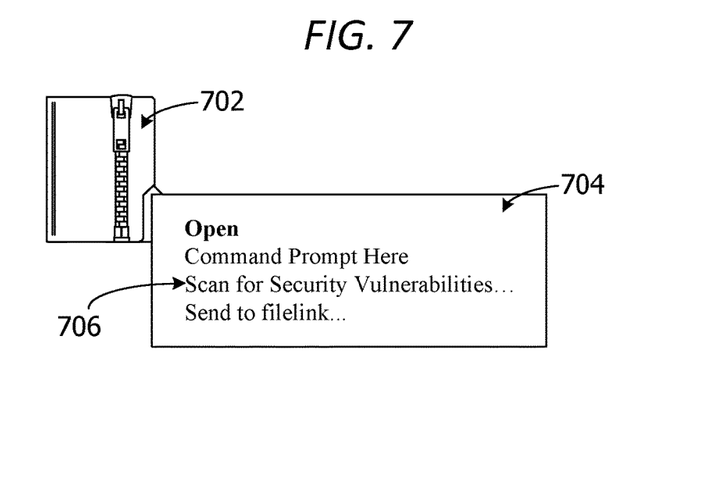
FIG. 7 is an exemplary screenshot illustrating a single-click menu option on a graphical user interface.

FIG. 7 is an exemplary screenshot illustrating a single-click menu option on a graphical user interface. In this example, the source code zip file is represented by a graphical icon 702 in the GUI. When the user performs a right mouse click on the icon 702, a single-click menu option 704 is presented enabling the user to click on the scan menu option 706. In this non-limiting example, the scan menu option 706 is presented with the text "scan for security vulnerabilities". However, the examples are not limited to this text or representation of the scan menu option. If the user clicks on the option 706, security scanning of the source code zip file 702 is automatically initiated without any additional user interface with the system.

Figure 8:
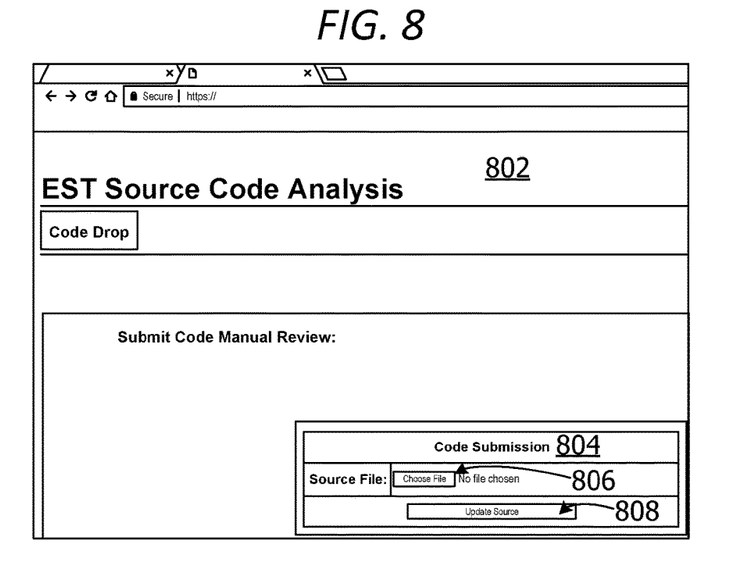
FIG. 8 is an exemplary screenshot illustrating a web interface for initiating code scanning.

FIG. 8 is an exemplary screenshot illustrating a web interface 802 for initiating code scanning. The web interface 802 is a single-command menu option for initiating scan of source code, such as, but not limited to, the web interface 314 in FIG. 3.

The web interface 802 enables a user to choose a file/folder containing a source code submission 804 for scanning. In this non-limiting example, the user indicates a source file via a text box 806. The user clicks on the upload source 808 icon to initiate upload of the selected source file to the scan queue.

Figure 9:
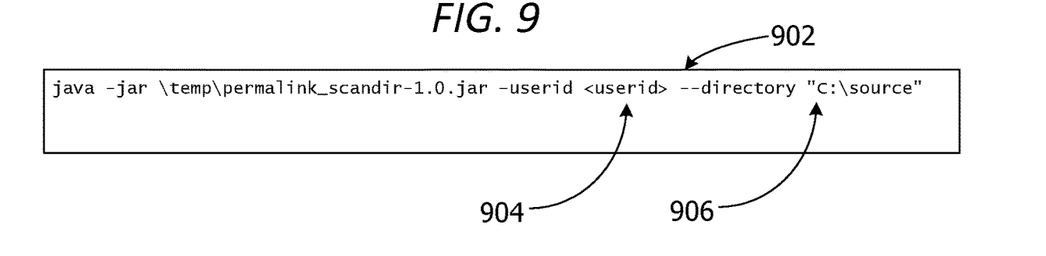
FIG. 9 is an exemplary screenshot illustrating a command-line utility for initiating code scanning.

FIG. 9 is an exemplary screenshot illustrating a command-line utility 902 for initiating code scanning. The command-line utility is a single-command menu option, such as, but not limited to, the command-line utility 306 in FIG. 3. The user provides a user ID 904 and a directory 906 where the source code is located to initiate security scanning of the selected source code.

ADDITIONAL EXAMPLES

In some examples, the system provides a plurality of methods to deliver content to a security scanner (right hand mouse button menu item, web to upload source, command-line utilities that take a file or directory as an argument). The system improves ease of checking/scanning code and enables fast and efficient code scanning multiple times for security flaws. The system makes code more secure and reliable, reduces coding errors and eliminates vulnerabilities in code.

Moreover, the code scanning manager enables scanning via tools that is independent of platform. Users do not have to install security software on thousands of developers machines to enable scanning of code on those machines. Nor do users have to continually update plugins or other code on client devices to support utilization of various platform-specific code scanning tools. This further simplifies security processes to increase usage of code security scanning and improve/simplify code scanning training and availability to diverse clients.

In some examples, the system provides a quick way for a user to check security of code without installing any client components. The system scans a zip file of code to be sent for scanning. A target directory sits and waits for any code scan. The system can optionally append a user ID to the file/folder that is placed in the Target directory. The user ID is extracted from the file/folder that is being scanned to determine where to send the scan results. The results of the scan are returned to the user in an email. The system provides a mechanism to securely transfer contents to a directory on a server where security software is installed, a directory that has a listener that extracts the username, submits the scan, and downloads scan results, and sends to those results via email. This single-click menu option enables scanning of folder or source files for security vulnerabilities with minimal user interaction.

The system reduces the user interface during the code scanning process such that a web browser is unnecessary. A right-click button menu item is provided in some examples to zip up a source code folder and automatically submit it to the appropriate security scan component.

In other examples, a command-line version of the single-command menu option takes a directory and user name as arguments to invoke scanning of selected source code. Any process can have security scans built into them with minimal modifications to the system in which it is being integrated. Moreover, the command-line utility enables just-in-time project creation and just-in-time user creation.

A scan queue on a server in other examples accepts web service calls to copy source code files into it. A listener on that directory feeds the security scanning software.

In an illustrative example, the security scanning in other examples, provides a right-hand mouse button menu item. The menu item can be provided in Window, Linux, or Mackintosh. The menu item includes an option to "Scan this Directory for Security Flaws". The menu options are not limited to this wording. In other examples, the option can be represented by text or graphical images, such as, but not limited to, a "scan code" option, a "quick scan" option or any other text or graphic.

In other examples, a website is provided where users can upload a zip file containing source code for security scanning. A JAVA client component takes two arguments: the username, and the directory with code to scan. All components work together and return an email with the security scan results. This occurs without the user having to interact with any level of expertise in any tools. The user creation, project creation, and project access are all handled automatically. In addition, the tool used to implement this can be called from any process that can pass it two arguments. This makes it possible to integrate security scanning into any arbitrary process with minimal changes. All communications are encrypted and scan results are protected.

Alternatively, or in addition to the other examples described herein, examples include any combination of the following:

an encryption component, implemented on the at least one processor, encrypts a security scan result prior to transmission to the user;

wherein the single-command menu option further comprises a single click menu option associated with a graphical user interface;

wherein the user performs a right mouse button click on a scan menu option associated with a graphical icon representing the selected source code to initiate the security scanning of the selected source code;

wherein the single-command menu option further comprises a command-line utility comprising a JAVA client accepting a user name and a directory containing the selected source code;

wherein the single-command menu option further comprises a web interface configured to enable upload of a zip file containing the selected source code to a scan queue associated with a security scan component;

wherein the web interface accepts a web service call to copy the selected source code into the scan queue;

an extraction component, implemented on the at least one processor, extracts the user ID from the selected source code and identifies the user associated with the source code based on the user ID;

an email address associated with the user ID, wherein the summary scan results report is transmitted to the email address for review by the user;

wherein the selected source code is a zip file containing a set of files or at least one folder;

uploading, by a scan initiation component, a selected source code to a target directory on condition a user initiates security scanning of the selected source code by selecting a single-command menu option, the selected source code including a user identifier (ID) appended to the selected source code;

transferring, by a listener component, the selected source code from the target directory to a security scan component in response to detecting a presence of the selected source code in the target directory;

transmitting, by a results component, a summary scan results report to the user associated with the selected source code via an email account associated with the user on condition security scanning of the selected source code is complete;

encrypting, by an encryption component, the summary scan result prior to transmission to the user email account;

presenting a right mouse button menu option for initiating a security scan on the selected source code via a single activation of the right mouse button;

accepting a user name and a directory containing the selected source code via a command-line utility comprising a JAVA client to initiate the security scan of the selected source code;

uploading a zip file containing the selected source code to a scan queue associated with a security scan component via a web interface, wherein the web interface accepts a web service call to copy the selected source code into the scan queue;

transmitting the summary scan results report to the user via an email address associated with the user ID appended to the selected source code;

outputting a right mouse button menu option for initiating a security scan on the selected source code via a single activation of the right mouse button;

uploading, by a scan initiation component, a selected source code to a target directory on condition a user initiates security scanning of the selected source code by clicking on the right mouse button menu option, the selected source code including a user identifier (ID) appended to the selected source code;

transferring, by a listener component, the selected source code from the target directory to a security scan component in response to detecting a presence of the selected source code in the target directory;

transmitting, by a results component, a summary scan results report to the user associated with the selected source code via an email account associated with the user on condition security scanning of the selected source code is complete;

encrypting the summary scan result prior to transmission to the user email account;

wherein the selected source code is a zip file containing a set of files or at least one folder; and transmitting the summary scan results report to the user via an email address associated with the user ID appended to the selected source code.

At least a portion of the functionality of the various elements in FIG. 1, FIG. 2, FIG. 3 and FIG. 4 can be performed by other elements in FIG. 1, FIG. 2, FIG. 3 and/or FIG. 4, or an entity (e.g., processor 106, web service, server, application program, computing device, etc.) not shown in FIG. 1, FIG. 2, FIG. 3 and/or FIG. 4.

In some examples, the operations illustrated in FIG. 5 and/or FIG. 6 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for providing security scanning code with minimal user interface. For example, the elements illustrated in FIG. 1, FIG. 2, FIG. 3 and FIG. 4, such as when encoded to perform the operations illustrated in FIG. 5 and FIG. 6, constitute exemplary means for uploading source code to a target directory when a single-command menu option is activated by a user to initiate security scanning of the selected source code; submitting the selected source code to a security scan component associated with a remote computing device via a network; and transmitting a summary scan results report to the user associated with the selected source code.

Other non-limiting examples provide a computer program product, comprising a computer usable medium having a computer readable program code embodied therein, the computer readable program code adapted to be executed to implement a method for code security scanning. A right mouse button menu option for initiating a security scan on a selected source code is output via a single activation of a mouse button. A scan initiation component uploads the selected source code to a target directory on condition a user initiates security scanning of the selected source code by clicking on a menu option associated with a mouse button, the selected source code including a user identifier (ID) appended to the selected source code. A listener component transfers the selected source code from the target directory to a security scan component in response to detecting a presence of the selected source code in the target directory. A results component transmits a summary scan results report to the user associated with the selected source code via an email account associated with the user on condition the security scanning of the selected source code is complete.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a memory of a computing device;
at least one processor of the computing device communicatively coupled to the memory;
a code scanning manager, stored on the memory and implemented on the at least one processor, that:
appends a user identifier (ID) to selected source code in a file, and
in response to appending the user ID to the selected source code, generates a zip file including the file including the selected source code with the appended user ID, wherein the user ID is an identifier associated with a user;
a user interface device outputting a single-command menu option associated with the selected source code stored in the zip file;
a scan initiation component, implemented on the at least one processor, that, based on a selection of the single-command menu option, uploads the zip file including the file including the selected source code with the appended user ID to a target directory via a network;
a listener component, implemented on the at least one processor, periodically checks the target directory for unscanned code and submits the selected source code to a security scan component associated with a remote computing device via the network;
an extraction component, implemented on the at least one processor, extracts the user ID from the selected source code in the zip file; and
a results component, implemented on the at least one processor, transmits via an email server a summary scan results report to the user associated with the user ID extracted from the selected source code,
wherein the user interface device further receives a request to access the transmitted summary scan results report, and
wherein the results component further determines to grant the request to access the transmitted summary scan results report based on a requesting user ID associated with the request matching the appended user ID to the selected source code in the file.

2. The system of claim 1, further comprising:
an encryption component, implemented on the at least one processor, encrypts the summary scan results report prior to the results component transmitting the encrypted summary scan results report to the user.

3. The system of claim 1, wherein the single-command menu option further comprises a single click menu option associated with a graphical user interface, wherein the user performs a right mouse button click on a scan menu option associated with a graphical icon representing the selected source code to initiate the security scanning of the selected source code.

4. The system of claim 1, wherein the single-command menu option further comprises a command-line utility comprising a JAVA client accepting the user ID and the target directory containing the selected source code.

5. The system of claim 1, wherein the single-command menu option further comprises a web interface configured to enable upload of the zip file containing the selected source code to a scan queue associated with the security scan component, wherein the web interface accepts a web service call to copy the selected source code into the scan queue.

6. The system of claim 1, wherein:
the extraction component further identifies the user associated with the source code based on the user ID, and
the listener component further identifies the selected source code as the unscanned code and submits the selected source code as the unscanned code to the security scan component.

7. The system of claim 1, wherein:
the extraction component further identifies an email address associated with the user ID based on the user ID extracted from the selected source code in the zip file, and
the results component transmits the summary scan results report to the identified email address.

8. The system of claim 1, wherein:
the selected source code is a zip file containing a set of files or at least one folder,
the user interface device further receives an input updating a preconfigured interval at which a target directory is checked for unscanned code,
the listener component checks the target directory for the unscanned code at the updated interval, and
the security scanning is a scan that analyzes the selected source code with the appended user ID for security vulnerabilities.

9. A computer-implemented method comprising:
appending, by a code scanning manager implemented on a computing device, a user identifier (ID) to selected source code in a file, wherein the user ID is an identifier associated with a user;
in response to appending the user ID to the selected source code, generating, by the code scanning manager, a zip file including the file including the selected source code with the appended user ID;
based on a selection of a single-command menu option, uploading, by a scan initiation component, the zip file including the file including the selected source code with the appended user ID to a target directory;
transferring, by a listener component, the selected source code from the target directory to a security scan component associated with a remote computing device in response to detecting a presence of the selected source code in the target directory;
extracting, by an extraction component, the user ID from the selected source code within the zip file; and
transmitting, by a results component via an email server, a summary scan results report to an email account of the user associated with the user ID extracted from the selected source code on condition the security scanning of the selected source code is complete, wherein the email account is associated with the user ID extracted from the selected source code;
receiving, by a user interface device, a request to access the transmitted summary scan results report, and
determining, by the results component, to grant the request to access the transmitted summary scan results report based on a requesting user ID associated with the request matching the appended user ID to the selected source code in the file.

10. The computer-implemented method of claim 9, further comprising:
encrypting, by an encryption component, the summary scan results report prior to the transmission to the email account of the user.

11. The computer-implemented method of claim 9, wherein the single-command menu option further comprises a single click menu option associated with a graphical user interface, and further comprising:
initiating the security scanning of the selected source code responsive to a right mouse button click on a scan menu option associated with a graphical icon representing the selected source code to initiate.

12. The computer-implemented method of claim 9, further comprising:
extracting the user ID from the selected source code and identifies the user associated with the source code based on the user ID.

13. The computer-implemented method of claim 9, further comprising:
presenting a right mouse button menu option for initiating the security scanning on the selected source code via a single activation of a mouse button.

14. The computer-implemented method of claim 9, further comprising:
accepting the user ID and the directory containing the selected source code via a command-line utility comprising a JAVA client to initiate the security scanning of the selected source code.

15. The computer-implemented method of claim 9, further comprising:
uploading the zip file containing the selected source code to a scan queue associated with the security scan component via a web interface, wherein the web interface accepts a web service call to copy the selected source code into the scan queue.

16. The computer-implemented method of claim 9, further comprising:
receiving user login information at a backend to log to the results component; and
in response to receiving the user login information at the backend to log in, displaying the summary scan results report to the user.

17. A non-transitory computer program product comprising a computer readable program code embodied therein that, upon execution by a processor, causes the processor to:
append, by a code scanning manager implemented on a computing device, a user identifier (ID) to selected source code in a file, wherein the user ID is an identifier associated with a user;
in response to appending the user ID to the selected source code, generate, by the code scanning manager, a zip file including the file including the selected source code with the appended user ID;
output a single-command menu option for initiating a security scan on the zip file including the selected source code with the appended user ID via a single activation of the single-command menu option;
based on a selection of the single command menu option, upload, by a scan initiation component, the zip file including the file including the selected source code with the appended user ID to a target directory, the selected source code including the user identifier (ID) appended to the selected source code;
transfer, by a listener component, the selected source code from the target directory to a security scan component associated with a remote computing device in response to detecting a presence of the selected source code in the target directory;
extract, by an extraction component, the user ID from the selected source code in the zip file;
transmit, by a results component via an email server, a summary scan results report to an email account of the user associated with the user ID extracted from the selected source code on condition the security scanning of the selected source code is complete, wherein the email account is associated with the user ID extracted from the selected source code;
receive, by a user interface device, a request to access the transmitted summary scan results report, and
determine, by the results component, to grant the request to access the transmitted summary scan results report based on a requesting user ID associated with the request matching the appended user ID to the selected source code in the file.

18. The non-transitory computer program product of claim 17, wherein the computer readable program code further causes the processor to:
 encrypt the summary scan results report prior to transmission to the email account of the user.

19. The non-transitory computer program product of claim 17, wherein the selected source code is a zip file containing a set of files or at least one folder.

20. The non-transitory computer program product of claim 17, wherein the computer readable program code further causes the processor to:
 transmit the summary scan results report to the user via an email address associated with the user ID appended to the selected source code.

* * * * *